(12) United States Patent
Olynyk (10) Patent No.: US 6,380,936 B1
(45) Date of Patent: Apr. 30, 2002

(54) SYSTEM AND METHOD FOR INFERRING PROJECTIVE MAPPINGS

(75) Inventor: Kirk Olynyk, Redmond, WA (US)

(73) Assignee: Microsoft Corportion, Redmond, WA (US)

( * ) Notice: Subject to any disclaimer, the term of this patent is extended or adjusted under 35 U.S.C. 154(b) by 0 days.

(21) Appl. No.: 09/425,675

(22) Filed: Oct. 22, 1999

(51) Int. Cl.$^7$ .............................................. G06T 17/00
(52) U.S. Cl. ..................................................... 345/427
(58) Field of Search ................................ 345/418, 419, 345/421, 422, 427

(56) References Cited

U.S. PATENT DOCUMENTS

| | | | |
|---|---|---|---|
| 5,319,744 A | * | 6/1994 | Kelly et al. .................. 345/427 |
| 5,361,385 A | * | 11/1994 | Bakalash ..................... 345/427 |
| 5,548,693 A | * | 8/1996 | Shinya ........................ 345/427 |
| 6,111,582 A | * | 8/2000 | Jenkins ....................... 345/427 |

OTHER PUBLICATIONS

Blinn, J.F., "Jim Blinn's Corner: Inferring Transforms," *IEEE Computer Graphics and Applications*, May/Jun., 1999, 93–98.

Heckbert, P.S., "Fundamentals of Texture Mapping and Image Warping," Master's Thesis, University of California, Berkeley, Department of Electrical Engineering and Computer Science, Jun. 17, 1989, 1–86.

\* cited by examiner

*Primary Examiner*—Cliff N. Vo
(74) *Attorney, Agent, or Firm*—Woodcock Washburn LLP (57) ABSTRACT

A system and method are provided for defining a projective mapping of quadrilaterals by specifying the images of four independent points and imposing the additional constraint that straight lines are mapped to straight lines. A barycentric coordinate system is used to represent four points in the source space and their corresponding four points in the destination space. The two barycentric coordinate systems are related by a mapping from the points in the source space to the points in the destination space such that the barycentric coordinates of all four input points map to the barycentric coordinates of their respective output points. A ratio of the associated weights is determined for each of the three basis points in the two spaces. These ratios provide a triplet that defines the mapping (transformation) in three coordinates. These three coordinates are then transformed to the 3×3 industry standard projection matrix for projective mapping.

20 Claims, 3 Drawing Sheets

SYSTEM AND METHOD FOR INFERRING PROJECTIVE MAPPINGS

COPYRIGHT AUTHORIZATION

The Appendix of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to computer graphics systems using projective mapping of a two-dimensional (2D) image to be rendered on a screen. Still more particularly, the present invention relates to a barycentric coordinate system for improved projective mapping of a 2D image after a transformation or distortion.

BACKGROUND OF THE INVENTION

In a computer graphics system, it is desirable to represent an object as efficiently as possible to preserve memory and system bandwidth, and to enhance rendering speed. Computer graphics, such as in computer generated images, animations and effects for motion pictures, television, computer multi-media, computer games, print and other media, often employ applications such as two-dimensional projective mapping during rendering images of objects. A 2D mapping is a mapping or transformation that distorts a 2D source space into a 2D destination space. A source point is mapped to a destination point according to a predetermined function. Current graphics cards and graphics accelerators use an industry standard 3×3 projection matrix for projective mapping.

In two-dimensional projective mapping, a 2D image is rendered on a screen after some transformation or distortion. To accomplish this, a (U,V) projective coordinate must be determined for each (X,Y) location on the screen. A common transformation is $$U = \frac{aX + bY + c}{gX + hY + j}, \quad V = \frac{dX + eY + f}{gX + hY + j}.$$

By picking the proper values for the coefficients a . . . j, the 2D projection can be manipulated to an arbitrary position, orientation, and perspective projection on the screen. The coefficients can be generated by a concatenation of 3D rotation, translation, scale, and perspective matrices, so the homogeneous matrix representation of this transformation is used, as follows:

$$[X \quad Y \quad 1] \begin{bmatrix} a & d & g \\ b & e & h \\ c & f & j \end{bmatrix} = [u \quad v \quad w]$$

$$[U \quad V] = \left[\frac{u}{w} \quad \frac{v}{w}\right].$$

A more direct approach to finding a . . . j uses a 2D to 2D mapping that is specified by four arbitrary points in screen space and the corresponding four arbitrary points in destination space that are mapped into the points in source space. A restriction is that no three of the input or output points may be collinear. This method of transformation specification is useful, for example, in taking flat objects digitized in perspective and processing them into orthographic views.

Figure 3:
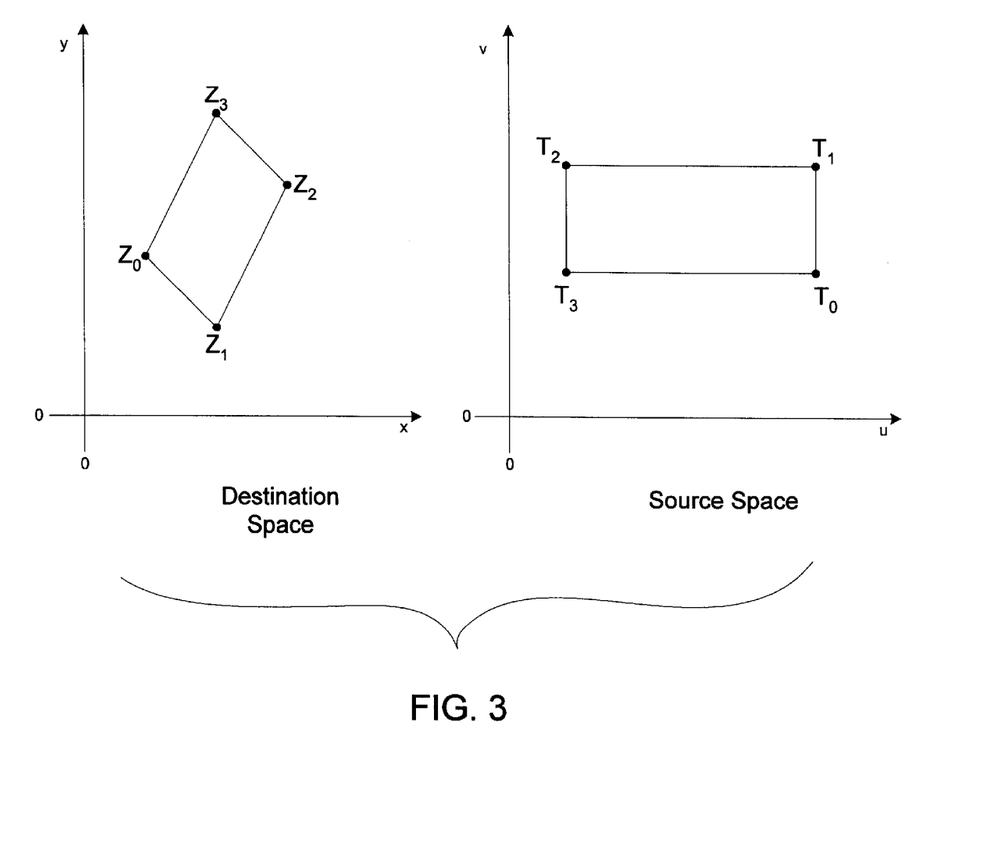
FIG. 3 is a diagram showing an exemplary object in source space and its corresponding mapping in destination space.

As shown in FIG. 3, given four 2D screen coordinates $Z_i=(X_i, Y_i, 1)$, and four 2D projective coordinates $T_i=(U_i, V_i, 1)$, it is desirable to find the 3×3 homogeneous transformation $M_{st}$ that maps one to the other so that $Z_i M_{st} = w_i T_i$ (Eq. 1). Note that the $w_i$ values in the equation acknowledge the fact that even though the original input and output points are nonhomogeneous (their third component is 1), the output of the matrix multiplication will be homogeneous. The w values are determined as a side effect of solving for the elements of $M_{st}$.

For one conventional solution, using a . . . j for the elements of $M_{st}$, Equation 1 is rewritten as $$[X_i \quad Y_i \quad 1] \begin{bmatrix} a & d & g \\ b & e & h \\ c & f & j \end{bmatrix} = w_i [U_i \quad V_i \quad 1]$$

Multiplying out and equating each component results in:
$aX_i+bY_i+c=w_iU_i$
$dX_i+eY_i+f=w_iV_i$
$gX_i+hY_i+j=w_i$
Rearranging gives:
$aX_i+bY_i+c-gX_iU_i-hY_iU_i-jU_i=0$
$dX_i+eY_i+f-gX_iV_i-hY_iV_i-jV_i=0$.
Writing this as a matrix equation in terms of a . . . j gives:

$$\begin{bmatrix} X_i & Y_i & 1 & 0 & 0 & 0 & -X_iU_i & -Y_iU_i & -U_i \\ 0 & 0 & 0 & X_i & Y_i & 1 & -X_iV_i & -Y_iV_i & -V_i \end{bmatrix} \begin{bmatrix} a \\ b \\ c \\ d \\ e \\ f \\ g \\ h \\ j \end{bmatrix} = \begin{bmatrix} 0 \\ 0 \end{bmatrix}$$

Each input point gives two more nine element rows; four points give an 8×9 matrix. Because this is a homogeneous system, that is all that is needed to solve for the nine values a . . . j (with an arbitrary global scale factor). One way to determine each of these nine values is to find the determinant of the 8×8 matrix formed by deleting the matching column of the 8×9 matrix. However, this is very complex.

Heckbert provides an improvement by splitting the transformation into two separate matrices (Heckbert, Fundamentals of Texture Mapping and Image Warping, Master's Thesis, Univ. of California, Berkeley, Dept. of Electrical Engineering and Computer Science, 1989). Heckbert first maps the input points to a canonical unit square with one matrix, and then maps that square into the output points of another matrix. Each of these matrices is easier to calculate than the complete transformation. Heckbert uses 4 divides, 65 adds, and 69 multiplies to provide the industry standard 3×3 projection matrix for projective mapping. Because of the divides, Heckbert's technique is slow and processor-intensive.

There is a wide range of applications involving computer graphics in which it is necessary or desirable to provide projective mapping. Accordingly, a goal of the present invention is to provide a projective mapping transformation that is efficient and accurate and avoids using comparisons and divisions.

SUMMARY OF THE INVENTION

The present invention provides systems and methods for providing improved (faster for a given amount of computer resources) computer projective mapping of a 2D image to be rendered on a screen after some transformation or distortion, and can be used in interactive applications such as 3D video games and virtual environments.

The invention provides an improved technique for defining a projective mapping of quadrilaterals by specifying the images of four independent points and imposing the additional constraint that straight lines are mapped to straight lines. The invention performs 49 adds and 48 multiplies to achieve the desired 3×3 projection matrix. This is more efficient than conventional techniques which typically use multiple divides to provide the industry standard 3×3 projection matrix for projective mapping.

According to the present invention, a barycentric coordinate system is used to represent four points in the source space and their corresponding four points in the destination space. Barycentric coordinates represent an arbitrary point (e.g., one of the four points) in the plane as the weighted sum of three basis points (e.g., the three other points). The present invention uses the constraint that the barycentric coordinates sum to one (i.e., the weights on the three points sum to 1). The two barycentric coordinate systems are related by a mapping from the points in the source space to the points in the destination space such that the barycentric coordinates of all four input points map to the barycentric coordinates of their respective output points. A ratio of the associated weights is determined for each of the three basis points in the two spaces. These ratios provide a triplet that defines the mapping (transformation) in three coordinates. These three coordinates are then transformed to the 3×3 industry standard.

Thus, the present invention more efficiently manipulates 16 numbers (four points in two spaces, each point having two coordinate values) to provide the 9 numbers used by current graphics cards and graphics accelerators.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like reference numerals represent similar parts throughout the several views of the drawings, it being understood, however, that the invention is not limited to the specific methods and instrumentalities disclosed. In the drawings.

DETAILED DESCRIPTION OF THE ILLUSTRATED EMBODIMENTS

Overview

In a computer graphics system, it is desirable to represent an object as efficiently as possible to preserve memory and system bandwidth, and to enhance rendering speed. The present invention provides an improved technique for defining a projective mapping of quadrilaterals by specifying the images of four independent points and imposing the additional constraint that straight lines are mapped to straight lines.

A barycentric coordinate system is used to represent four points in the source space and their corresponding four points in the destination space. The two barycentric coordinate systems are related by a mapping from the points in the source space to the points in the destination space such that the barycentric coordinates of all four input points map to the barycentric coordinates of their respective output points. A ratio of the associated weights is determined for each of the three basis points in the two spaces. These ratios provide a triplet that defines the mapping (transformation) in three coordinates. These three coordinates are then transformed to the 3×3 industry standard projection matrix for projective mapping.

Initially, an exemplary computing environment will be described within which the present invention may be embodied. Component details and exemplary instrumentalities will follow.

Exemplary Operating Environment

Figure 1:
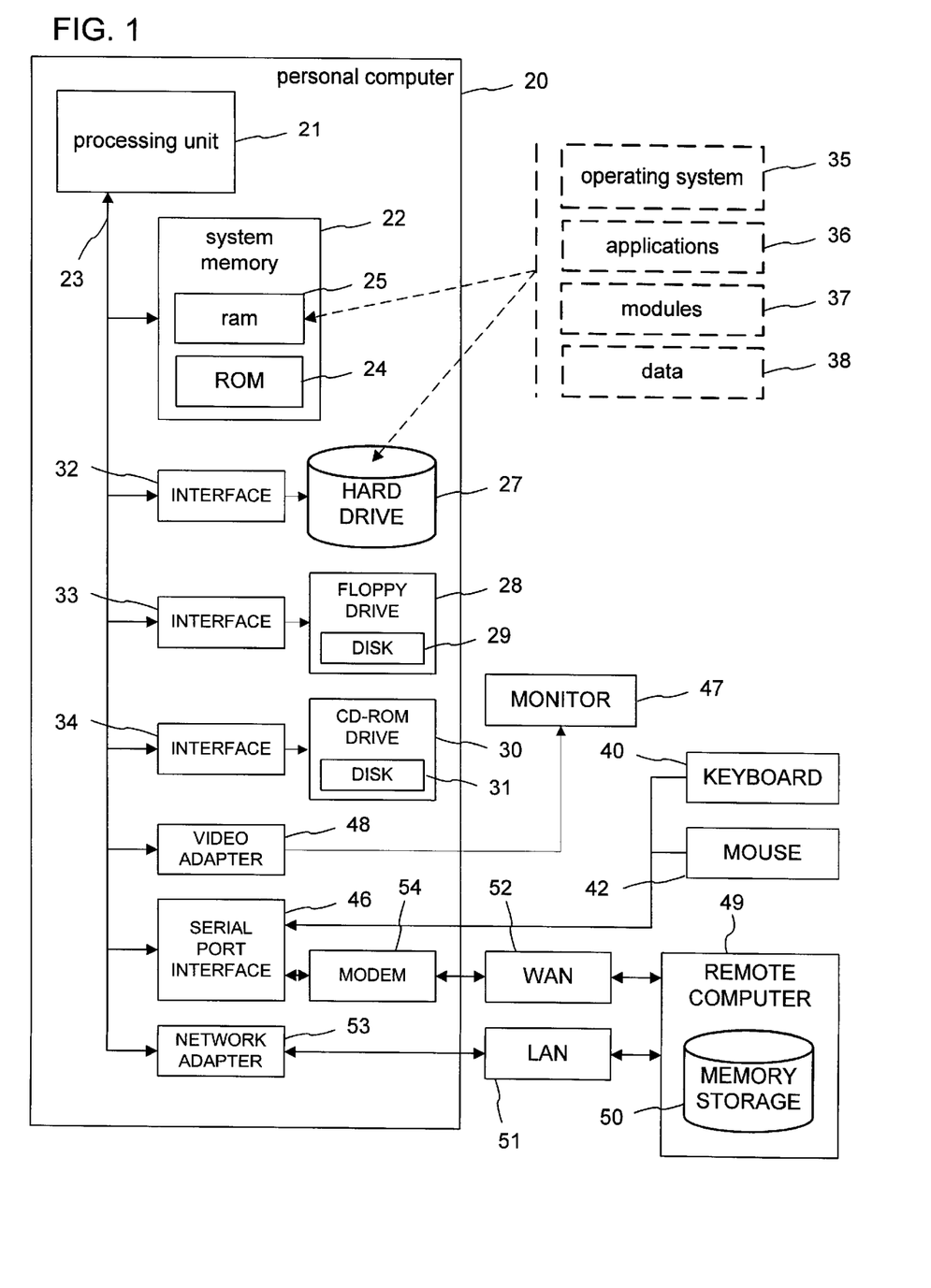
FIG. 1 is a block diagram of a computer system that can be used to implement a method and apparatus embodying the invention.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors. Dual microprocessors and other multiprocessor architectures also can be used as the processing unit 21.

The system bus may be any of several types of bus structure including a memory bus or memory controller, a peripheral bus, and a local bus using any of a variety of conventional bus architectures. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 farther includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port or a universal serial bus (USB). A monitor 47 or other type of display device is also connected to the system bus 23 via an, interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

The Projective Mapping Transformation of the Present Invention

It is well known that a projective mapping is defined by specifying the images of four independent points and imposing the additional constraint that straight lines are mapped to straight lines. The present invention is directed to a mapping that satisfies these conditions, thereby defining a projective mapping. The projection matrix that implements the mapping is determined using 49 adds and 48 multiplies, which is more efficient than the prior art which uses 4 divides, 65 adds, and 69 multiplies.

The present invention uses barycentric coordinates, rather than a unit square, as the intermediate system. Barycentric coordinates represent an arbitrary point in the plane as the weighted sum of three basis points.

Figure 2:
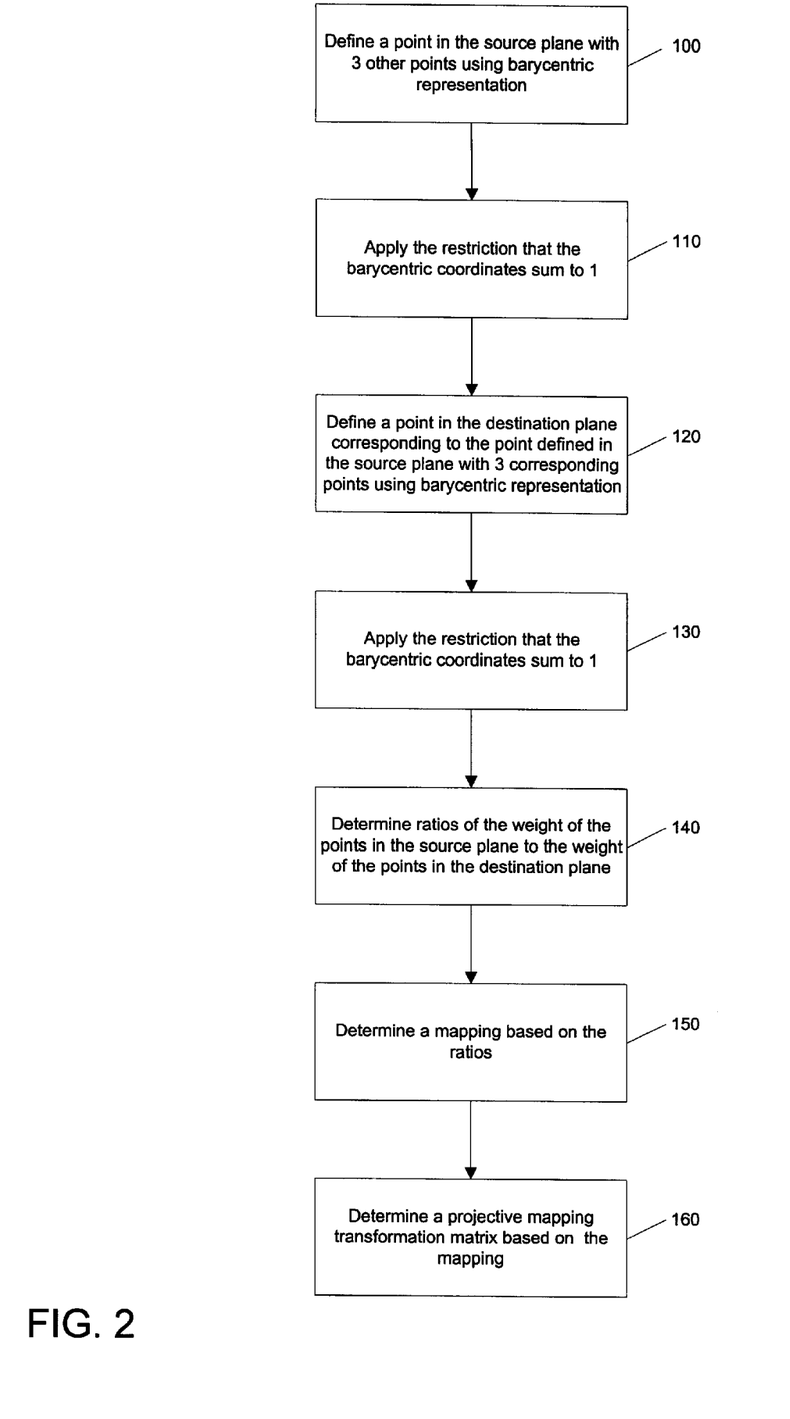
FIG. 2 is a flow diagram of an exemplary method of constructing a projective mapping transformation in accordance with the present invention.

FIG. 2 is a flow diagram of an exemplary method of constructing a projective mapping transformation in accordance with the present invention. At step 100, a point in the source space is defined with three other points using barycentric coordinates. Thus, a point is defined in the source plane as a function of three other points, weighted. The constraint that the weights sum to 1 is included at step 110. A corresponding point in the destination plane is defined at step 120 as a function of three points that correspond to the three points in the source plane. The constraint that the weights sum to 1 is included at step 130. At step 140, for each of the three weights, the ratios of the source space to the destination space is determined. A mapping is determined at step 150 based on the ratios. Using the mapping, a projective mapping transformation is determined at step 160 to connect the source and destination spaces.

More specifically, given a 4-tuple of points in a source space $\{T_0, T_1, T_2, T_3\}$, the first three of these points define a barycentric representation of the source space. In other words, an arbitrary point T in the source space is represented as $T=\tau_0 T_0+\tau_1 T_1+\tau_2 T_2$, where $\tau_0+\tau_1+\tau_2=1$. The remaining point of the 4-tuple is represented as $T_3=\tau_0^* T_0+\tau_1^* T_1+\tau_2^* T_2$, where $\tau_0^*$, $\tau_1^*$, and $\tau_2^*$ are the barycentric coordinates of $T_3$. Now, given a 4-tuple of points in the destination space $\{Z_0, Z_1, Z_2, Z_3\}$, again, the first three points of the 4-tuple are used as the basis of a barycentric representation $Z=\xi_0 Z_0+\xi_1 Z_1+\xi_2 Z_2$, and $Z_3=\xi_0^* Z_0+\xi_1^* Z_1+\xi_2^* Z_2$, where $\xi_0^*$, $\xi_1^*$, and $\xi_2^*$ are the barycentric coordinates of $Z_3$. It is assumed that no combination of any three points taken from either 4-tuple is collinear.

The transformation between the barycentric coordinates of the source and destination spaces is defined by $$\xi_i = \frac{\gamma_i \tau_i}{\gamma_o \tau_o + \gamma_1 \tau_1 + \gamma_2 \tau_2}$$

where the projective coefficients $\gamma_i$ are defined as $$\gamma_i = \frac{\xi_i^*}{\tau_i^*}, i = 0, 1, 2.$$

In practice, this division is not performed. Instead, both sides of the equation are multiplied by the denominator $(\tau_0^* \tau_1^* \tau_2^*)$ which does not change the physical point. This provides an equivalent value (up to a scalar multiple) and does not change the nature of the transformation. It should be noted that a projective space (also known as a homogeneous space) identifies all points that are scalar multiples of each other, so scaling a point does not change it in the new destination space. Thus, the division is avoided. This is a projective transformation. This mapping maps all four vertices of the source quadrilateral onto the vertices of the destination quadrilateral.

To get the desired mapping, each component $\tau_i$ is multiplied by $\gamma_i$, and then renormalized to a valid barycentric coordinate by dividing the sum of the components; i.e., $$\xi_i = \frac{\tau_i \gamma_i}{\sum \tau_i \gamma_i}.$$

The present method avoids this divide by multiplying all barycentric components by the denominator shown here. This does not change the physical point. This technique leaves the coordinates of the first three points intact while properly changing those of the fourth point.

To prove that straight lines are mapped to straight lines, suppose a linearly parametric representation of a line in the source coordinate system: $Z(s)=a+bs$. The barycentric coordinates of the source coordinate system are linear functions of s so that $d^2\tau_i/ds^2=0$. After the mapping, the barycentric coordinates of the primed coordinate system become rational functions of the parameter s. It can be shown that the curvature of the rationally parameterized curve in the destination space is identically zero and so the mapped line is a line.

At this point, the transformation is converted into the industry standard 3×3 matrix. 2D mappings are used to define the parameterization of a surface and to describe the transformation between the texture coordinate system and the screen coordinate system. The usual form of the homogeneous matrix transformation from screen to texture coordinates is $(u,v,w)=(x,y,z)M$, where M is a 3×3 matrix. The post projection values of the source space coordinates are given by $$(U, V) = \left(\frac{u}{w}, \frac{v}{w}\right). \quad \text{(Eq. 2)}$$

Non-homogeneous coordinates are denoted with upper case characters and coordinates in the intermediate homogeneous space are denoted with lower case characters. Now consider the barycentric formulation of the projective transformation from screen to texture space.

$$U = \sum_{j=0}^{2} \tau_j U_j = \frac{\sum \sigma_j \xi_j U_j}{\sum \sigma_k \xi_k} \quad \text{(Eq. 3)}$$

$$V = \sum_{j=0}^{2} \tau_j V_j = \frac{\sum \sigma_j \xi_j V_j}{\sum \sigma_k \xi_k} \quad \text{(Eq. 4)}$$

$$\text{where} \quad \sigma_j = \frac{\tau_j^*}{\xi_j^*} = \frac{1}{\gamma_j}$$

Comparing Equation 2 with Equations 3 and 4, the homogeneous coordinates can be identified as $u=\Sigma_{oj}\xi_j U_j$
$v=\Sigma_{oj}\xi_j V_j$
$w=\Sigma_{ok}\xi_k$ Because the $\xi_i$ are the barycentric representation of an arbitrary point on the screen with coordinates (X,Y), the $\xi_i$ are linear functions of X and Y. The coefficients of the homogeneous transformation matrix can now be deduced. First, each $\sigma_i\xi_i$ is expanded in terms of x and y using $\sigma_i\xi_i=a_ix+b_iy+c_i$. The values of the homogeneous matrix then are:

$$M = \begin{pmatrix} \sum a_i U_i & \sum a_i V_i & \sum a_i \\ \sum b_i U_i & \sum b_i V_i & \sum b_i \\ \sum c_i U_i & \sum c_i V_i & \sum a_i \end{pmatrix}.$$

Exemplary code for determining the projection matrix in accordance with the present invention is given in the Appendix.

Thus, the present invention performs projective transformations efficiently. 16 numbers are used to define the transformation. The present invention reduces these 16 numbers to 9 numbers that are used by conventional graphics cards. The present invention uses 49 adds and 48 multiplies, with no divisions, whereas the prior art Heckbert provides the transformation using 4 divides, 65 adds, and 69 multiplies.

Conclusion

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

APPENDIX

An example of code for producing the projection matrix is given below:

```
typedef struct_MAPVERTEX {
    double u; // dest coordinate
    double v;
    double x; // source coordinate
    double y;
} MAPVERTEX;
void GetProjectionMatrix(
const MAPVERTEX aVert[4]
double M[3][3]
)
{
#define U(i) aVert[i].u
#define V(i) aVert[i].v
#define X(i) aVert[i].x
#define Y(i) aVert[i].y
    double dx1 = X(1)-X(0);
    double dx2 = X(2)-X(0);
    double dx3 = X(3)-X(0);
    double dy1 = Y(1)-Y(0);
    double dy2 = Y(2)-Y(0);
    double dy3 = Y(3)-Y(0);
    double du1 = U(1)-U(0);
```

APPENDIX
-continued

```
        double du2 = U(2)-U(0);
        double du3 = U(3)-U(0);
        double dv1 = V(1)-V(0);
        double dv2 = V(2)-V(0);
        double dv3 = V(3)-V(0);
        double tau  = du1*dv2-dv1*du2;
        double tau1 = du3*dv2-dv3*du2;
        double tau2 = du1*dv3-dv1*du3;
        double tau0 = tau-tau1-tau2;
        double zeta  = dx1*dy2-dy1*dx2;
        double zeta1 = dx3*dy2-dy3*dx2;
        double zeta2 = dx1*dy3-dy1*dx3;
        double zeta0 = zeta-zeta1-zeta2;
        double sigma0 = tau0*zeta1*zeta2;
        double sigma1 = tau1*zeta2*zeta0;
        double sigma2 = tau2*zeta0*zeta1;
        double a1 = dy2;
        double b1 = dx2;
        double c1 = dx2*Y(0)-dy2*X(0);
        double a2 = -dy1;
        double b2 = +dx1;
        double c2 = dy1*X(0)-dx1*Y(0);
        double a0 = -(a1 + a2);
        double b0 = -(b1 + b2);
        double c0 = zeta-(c1 + c2);
        a0 *= sigma0;
        b0 *= sigma0;
        c0 *= sigma0;
        a1 *= sigma1;
        b1 *= sigma1;
        c1 *= sigma1;
        a2 *= sigma2;
        b2 *= sigma2;
        c2 *= sigma2;
        M[0][0] = a0*U(0) + a1*U(1) + a2*U(2);
        M[1][0] = b0*U(0) + b1*U(1) + b2*U(2);
        M[2][0] = c0*U(0) + c1*U(1) + c2*U(2);
        M[0][1] = a0*V(0) + a1*V(1) + a2*V(2);
        M[1][1] = b0*V(0) + b1*V(1) + b2*V(2);
        M[2][1] = c0*V(0) + c1*V(1) + c2*V(2);
        M[0][2] = a0 + a1 + a2;
        M[1][2] = b0 + b1 + b2;
        M[2][2] = c0 + c1 + c2;
        #undefU
        #undefV
        #undefX
        #undefY
        }
```

I claim:

1. A computer implemented process for generating a data structure that represents a projective mapping transformation matrix for a 2D image in a computer graphics system, comprising:
   providing a first plurality points in a barycentric coordinate system in a source space, wherein one of the points is a weighted sum of the other points, the weights on the other points summing to one, none of the first plurality of points being collinear;
   providing a second plurality of points in a barycentric coordinate system in a destination space corresponding to the points in the source space, wherein one point is a weighted sum of the other points, the weights on the other points summing to one, none of the second plurality of points being collinear; and
   using the first plurality of points and the second plurality of points to determine a projective mapping transformation matrix to map the first plurality of points to the second plurality of points.

2. The process according to claim 1, wherein the first plurality of points comprises four points, the second plurality of points comprises four points, and the projective mapping transformation matrix is a 3×3 matrix.

3. The process according to claim 2, wherein using the first and second plurality of points to determine the projective mapping transformation matrix comprises no more than 49 adds and 48 multiplies.

4. The process according to claim 2, wherein using the points to determine the projective mapping transformation matrix comprises determining a ratio of the associated weights for each of the other points in the source space and the destination space, wherein the ratios provide a triplet that defines a mapping transformation in three coordinates, and the projective mapping transformation matrix is based on the mapping transformation in three coordinates.

5. The process according to claim 4, wherein the four points in source space are represented as $\{T_0, T_1, T_2, T_3\}$, the first three of these points define a barycentric representation of the source space, each having a respective weight $\tau_0, \tau_1, \tau_2$, wherein $\tau_0+\tau_1+\tau_2=1$, wherein the remaining point of the four points is represented as $T_3=\tau_0*T_0+\tau_1*T_1+\tau_2*T_2$,
   wherein the four points in the destination space are represented as $\{Z_0, Z_1, Z_2, Z_3\}$, the first three of these points define a barycentric representation of the destination space, each having a respective weight $\xi_0, \xi_1, \xi_2$, wherein $\xi_0+\xi_1+\xi_2=1$, wherein the remaining point is represented as $Z_3=\xi_0*Z_0+\xi_1*Z_1+\xi_2*Z_2$, and
   wherein the mapping transformation between the barycentric coordinates of the source and destination spaces is defined by $$\xi_i = \frac{\gamma_i \tau_i}{\gamma_o \tau_o + \gamma_1 \tau_1 + \gamma_2 \tau_2}$$

wherein the projective coefficients $\gamma_i$ are defined as $$\gamma_i = \frac{\xi_i^*}{\tau_i^*},$$

i=0, 1, 2, wherein the projective coefficients are scaled to avoid divides in determining the projective mapping transformation matrix.

6. A computer readable medium having computer-executable instructions for performing the steps recited in claim 1.

7. A method for generating a projective mapping transformation matrix for a 2D image in a computer graphics system, comprising:
   providing four non-collinear points in a barycentric coordinate system in a source space, wherein one of the four points is a weighted sum of the other three points, the weights on the three points summing to one;
   providing four non-collinear points in a barycentric coordinate system in a destination space corresponding to the four points in the source space, wherein one of the four points is a weighted sum of the other three points, the weights on the three points summing to one;
   determining a plurality of ratios, each ratio equal to the weight of one of the other three points in the source space to the weight of the corresponding point in the destination space;
   determining a mapping based on the ratios; and
   transforming the mapping into the projective mapping transformation matrix.

8. The method according to claim 7, wherein transforming the mapping into the projective mapping transformation comprises no more than 49 adds and 48 multiplies.

9. The method according to claim 7, wherein the four points in source space are represented as $\{T_0, T_1, T_2, T_3\}$, the first three of these points define a barycentric representation of the source space, each having a respective weight $\tau_0, \tau_1, \tau_2$, wherein $\tau_0+\tau_1+\tau_2=1$, wherein the remaining point of the four points is represented as $T_3=\tau_0{}^*T_0+{}^*T_1+\tau_2{}^*T_2$, wherein the four points in the destination space are represented as $\{Z_0, Z_1, Z_2, Z_3\}$, the first three of these points define a barycentric representation of the destination space, each having a respective weight $\xi_0, \xi_1, \xi_2$, wherein $\xi_0+\xi_1+\xi_2=1$, wherein the remaining point is represented as $Z_3=\xi_0{}^*Z_0+\xi_1{}^*Z_1+\xi_2{}^*Z_2$, and wherein the mapping between the barycentric coordinates of the source and destination spaces is defined by $$\xi_i = \frac{\gamma_i \tau_i}{\gamma_o \tau_o + \gamma_1 \tau_1 + \gamma_2 \tau_2}$$

wherein the projective coefficients $\gamma_i$ are defined as $$\gamma_i = \frac{\xi_i^*}{\tau_i^*},$$

i=0, 1, 2, wherein the projective coefficients are scaled to avoid divides in determining the projective mapping transformation matrix.

10. A computer readable medium having computer-executable instructions for performing the steps recited in claim 7.

11. A data structure stored in a computer readable memory that represents a projective mapping transformation matrix for a 2D image in a computer graphics system, wherein the data structure provides a first plurality points in a barycentric coordinate system in a source space, wherein one of the points is a weighted sum of the other points, the weights on the other points summing to one, none of the first plurality of points being collinear, wherein the data structure further provides a second plurality of points in a barycentric coordinate system in a destination space corresponding to the points in the source space, wherein one point is a weighted sum of the other points, the weights on the other points summing to one, none of the second plurality of points being collinear; and wherein the points are used to determine a projective mapping transformation matrix to map the first plurality of points to the second plurality of points.

12. The data structure according to claim 11, wherein the first plurality of points comprises four points, the second plurality of points comprises four points, and the .projective mapping transformation matrix is a 3×3 matrix.

13. The data structure according to claim 12, wherein the projective mapping transformation matrix is determined using no more than 49 adds and 48 multiplies.

14. The data structure according to claim 12, wherein the projective mapping transformation matrix is determined by determining a ratio of the associated weights for each of the other points in the source space and the destination space, wherein the ratios provide a triplet that defines a mapping transformation in three coordinates, and the projective mapping transformation matrix is based on the mapping transformation in three coordinates.

15. The data structure according to claim 14, wherein the four points in source space are represented as $\{T_0, T_1, T_2, T_3\}$, the first three of these points define a barycentric representation of the source space, each having a respective weight $\tau_0, \tau_1, \tau_2$, wherein $\tau_0+\tau_1+\tau_2=1$, wherein the remaining point of the four points is represented as $T_3=\tau_0{}^*T_0+\tau_1{}^*T_1+\tau_2{}^*T_2$, wherein the four points in the destination space are represented as $\{Z_0, Z_1, Z_2, Z_3\}$, the first three of these points define a barycentric representation of the destination space, each having a respective weight $\xi_0, \xi_1, \xi_2$, wherein $\xi_0+\xi_1+\xi_2=1$, wherein the remaining point is represented as $Z_3=\xi_0{}^*Z_0+\xi_1{}^*Z_1+\xi_2{}^*Z_2$, and wherein the mapping transformation between the barycentric coordinates of the source and destination spaces is defined by $$\xi_i = \frac{\gamma_i \tau_i}{\gamma_o \tau_o + \gamma_1 \tau_1 + \gamma_2 \tau_2}$$

wherein the projective coefficients $\gamma_i$ are defined as $$\gamma_i = \frac{\xi_i^*}{\tau_i^*},$$

i=0, 1, 2, wherein the projective coefficients are scaled to avoid divides in determining the projective mapping transformation matrix.

16. In a computer implemented device having a graphics engine, and a computer readable storage medium having computer executable components, the computer executable components comprising:

a data store for storing a first plurality points in a barycentric coordinate system in a source space, wherein one of the points is a weighted sum of the other points, the weights on the other points summing to one, none of the first plurality of points being collinear, and a second plurality of points in a barycentric coordinate system in a destination space corresponding to the points in the source space, wherein one point is a weighted sum of the other points, the weights on the other points summing to one, none of the second plurality of points being collinear; and a processor for reading the data store and determining a projective mapping transformation matrix to map the first plurality of points to the second plurality of points.

17. The device according to claim 16, wherein the first plurality of points comprises four points, the second plurality of points comprises four points, and the projective mapping transformation matrix is a 3×3 matrix.

18. The device according to claim 17, wherein the processor uses the first and second plurality of points to determine the projective mapping transformation matrix using no more than 49 adds and 48 multiplies.

19. The device according to claim 17, wherein the processor uses the points to determine the projective mapping transformation matrix by determining a ratio of the associated weights for each of the other points in the source space and the destination space, wherein the ratios provide a triplet that defines a mapping transformation in three coordinates, and the projective mapping transformation matrix is based on the mapping transformation in three coordinates.

20. The device according to claim 19, wherein the four points in source space are represented as $\{T_0, T_1, T_2, T_3\}$, the first three of these points define a barycentric representation of the source space, each having a respective weight $\tau_0, \tau_1, \tau_2$, wherein $\tau_0+\tau_1+\tau_2=1$, wherein the remaining point of the four points is represented as $T_3=\tau_0{}^*T_0+\tau_1{}^*T_1+\tau_2{}^*T_2$, wherein the four points in the destination space are represented as $\{Z_0, Z_1, Z_2, Z_3\}$, the first three of these points define a barycentric representation of the destination space, each having a respective weight $\xi_0, \xi_1, \xi_2$, wherein $\xi_0+\xi_1+\xi_2=1$, wherein the remaining point is represented as $Z_3=\xi_0*Z_0+\xi_1*Z_1+\xi_2*Z_2$, and wherein the mapping transformation between the barycentric coordinates of the source and destination spaces is defined by $$\xi_i = \frac{\gamma_i \tau_i}{\gamma_o \tau_o + \gamma_1 \tau_1 + \gamma_2 \tau_2}$$

wherein the projective coefficients $\gamma_i$ are defined as $$\gamma_i = \frac{\xi_i^*}{\tau_i^*},$$

i=0, 1, 2, wherein the projective coefficients are scaled to avoid divides in determining the projective mapping transformation matrix.

* * * * *

UNITED STATES PATENT AND TRADEMARK OFFICE
CERTIFICATE OF CORRECTION

PATENT NO. : 6,380,936 B1
DATED : April 30, 2002
INVENTOR(S) : Kirk Olynyk

It is certified that error appears in the above-identified patent and that said Letters Patent is hereby corrected as shown below:

Column 5,
Line 25, delete the comma after "an".

Column 7,
Line 12, in the equation: "$\Sigma$" $\tau i \gamma i$ should read -- $\Sigma_{\tau i \gamma i}$ --.

Signed and Sealed this

Twenty-third Day of July, 2002

Attest:

JAMES E. ROGAN
Attesting Officer    Director of the United States Patent and Trademark Office